(No Model.) 2 Sheets—Sheet 2.
A. J. BARBER.
FRUIT SLICING MACHINE.
No. 483,731. Patented Oct. 4, 1892.
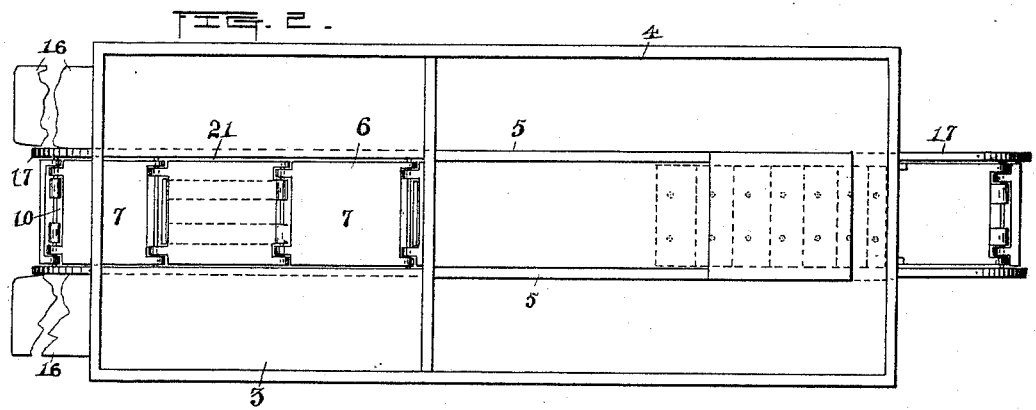
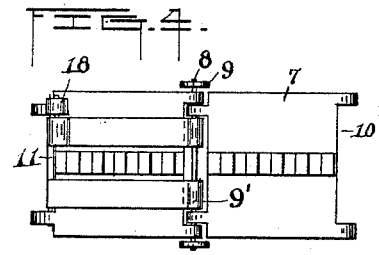
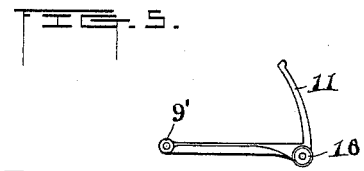
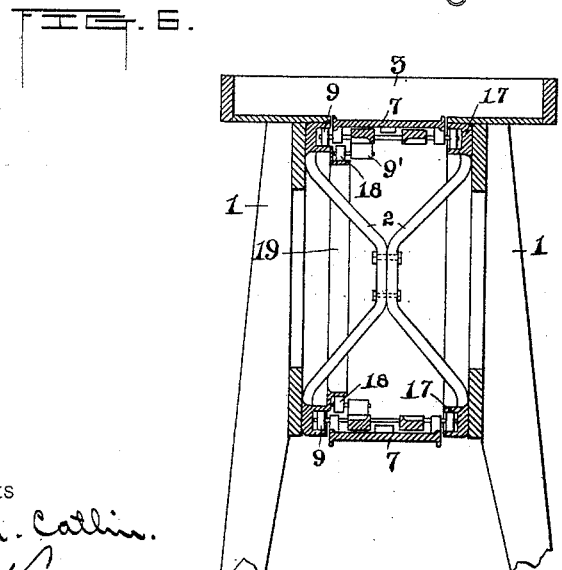
WITNESSES
Arch. M. Catlin.
O. H. Kean.
INVENTOR
Arthur J. Barber
by
Benj. R. Catlin
Atty.
THE NORRIS PETERS CO., PHOTO-LITHO., WASHINGTON, D. C.

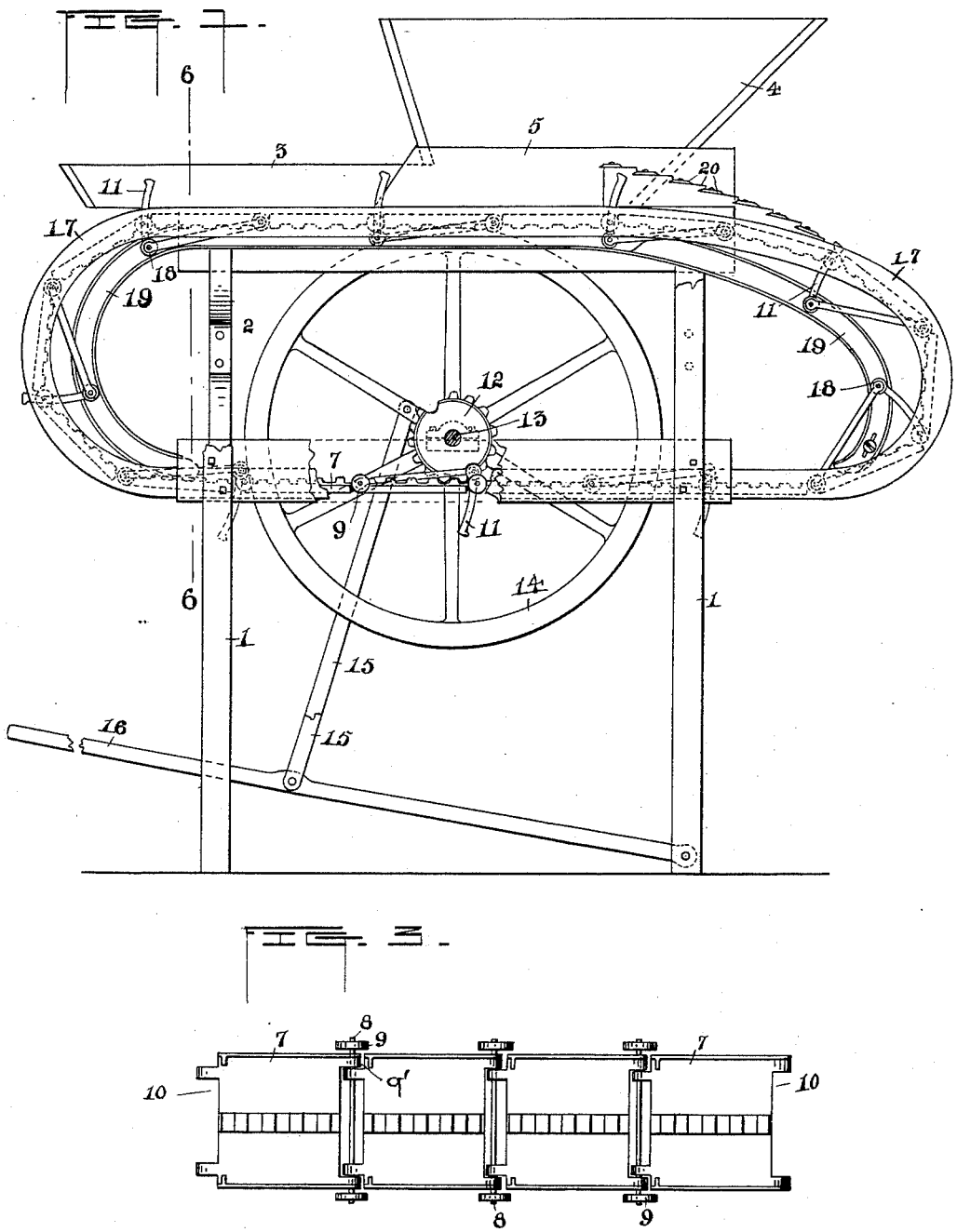

UNITED STATES PATENT OFFICE.

ARTHUR J. BARBER, OF SODUS, NEW YORK, ASSIGNOR OF ONE-HALF TO HENRY A. TRIPP AND WALTER TRIPP, BOTH OF SAME PLACE.

FRUIT-SLICING MACHINE.

SPECIFICATION forming part of Letters Patent No. 483,731, dated October 4, 1892.

Application filed November 30, 1891. Serial No. 413,480. (No model.)

*To all whom it may concern:*

Be it known that I, ARTHUR J. BARBER, a resident of Sodus, in the county of Wayne and State of New York, have invented certain new and useful Improvements in Fruit-Slicing Machines; and I do hereby declare the following to be a full, clear, and exact description of the invention, such as will enable others skilled in the art to which it pertains to make and use the same.

The invention relates to that class of fruit-slicers in which a series of blades are combined with devices for moving the fruit against the edges of said blades, said devices being operated by a treadle or other mechanism, and the whole combined with a suitable supply-hopper.

The object of the present invention is to provide feeding devices which will hold the fruit with certainty and in the position desired, and also to increase the general efficiency and capacity of the machine; and it consists in the matters hereinafter described, and particularly pointed out in the claims.

In the accompanying drawings, Figure 1 is a side elevation, partly in section. Fig. 2 is a plan; Fig. 3, a bottom plan of a portion of a carrying-belt; Fig. 4, a similar view showing a fruit-pusher attached. Fig. 5 is a view of a pusher; and Fig. 6 is a partial section on line 6 6, Fig. 1.

Numeral 1 denotes the legs, and 2 the main part of a supporting-frame.

3 indicates a feeding box or table, and 4 a hopper.

5 indicate two partitions, on the outside of each of which is a feeding-chute through which fruit—such as apples—automatically descend upon the table 3. Between the planes passing through the partitions, respectively, and below the hopper are arranged a series of blades 20, detachably fastened to suitable supports connected with the machine-frame, the edges of these blades being arranged in a curve in a vertical plane. Preferably these blades are made of brass and are provided with cutting-edges on opposite sides. They can when worn upon one side be turned to present their opposite edge to the fruit, whereby their life is doubled.

6 denotes an endless carrying-belt, composed in the present instance of links 7, hinged together by means of pins 8, provided with rollers 9. These links are recessed at 10 to afford space for the hinges 9' of the fruit-pushers and for the passage of their curved part 11. The under or inner side of each link is provided with a rack adapted to be engaged by the teeth of the spur-gear 12, fast on a driving-shaft 13, supported to turn in bearings in the frame. On each end of this shaft is a balance-wheel 14, one only being shown.

15 15 are rods loosely attached to the wheels or crank-arms on the shaft and having their opposite ends in like manner connected to the treadle, which has two parts 16 suitably disposed for the purpose. By this construction either part of the treadle can be used to run the machine or both parts can be used, as may be conveniently done when the operator is seated. It is not essential, however, that power be applied to drive the belt by the particular means illustrated, as these may be varied, so long as the principles of operation and construction herein set forth are not departed from.

The wheels 9 of the endless belt in the present instance run on ways 17, which at their ends are made double and curved, as shown.

The fruit-pushers 11 are hinged to the chain-pins 8, as indicated in Fig. 4. They are provided each with a wheel 18 to run in ways or tracks 19, which are made double at the ends of the machine, as shown. On the lower side the track is omitted and the pusher simply hangs in the chain. The curved tracks are so arranged as to draw the pushers inwardly at the ends of the machine, as indicated. The upper portion of the track is so disposed with relation to the feeding table or box that the pusher rises above the plane upon which the fruit rests in position to hold it while carried by the chain toward and against the slicing-blades, the box being suitably slotted at 21 to permit this operation.

To use the slicing-machine, apples or other suitable fruit or vegetables are placed in the hopper, from which they gradually fall by gravity into the feeding-box, descending through the chutes on the outside of each partition 5. They are then placed by the operator, using either or both hands, upon the chain or belt, where it is exposed by the slot in the bottom of the box and in front of one of the several pushers. The shaft 13 being driven by any suitable means, the endless chain is moved to carry the apples placed upon it against the blades, and also to move the pushers against the apples, whereby the latter are forced through and between the blades and cut into slices. The pushers are so shaped and proportioned that they bear on each apple above its horizontal center and press it down, as well as forward, whereby the turning of the apple on the chain with the effect to break the slices is avoided. The apple is customarily so placed and held as to be sliced transversely to the direction of its stem, and with the straight pushers heretofore employed pressing against the middle of the apple the latter is very liable to be turned with the effect to break the partly-cut slices and to present the apple to the blades in a direction oblique to its stem-line. The edges of the blades are arranged in a curve and the adjacent track of the pusher has a similar curvature, so that the top of the pusher, which bears on the upper side or edge of the apple, has a constant situation with respect to the cutting-edges and always holds or supports the apple against the pressure caused by cutting, and this holding action is always in approximately the same horizontal plane with all the blades in action, including the upper one. The carrying-chain has tracks at the points between the blades and the pusher-track so curved as to suitably support the apple vertically to present the last uncut portion of the apple to the last blade, as indicated in the drawings. For this purpose the blade edges are arranged in a curved plane having a greater curvature than that of the tracks for the wheels of the chain, so that if said plane were sufficiently prolonged it would intersect the tracks. As the chain carries the apples and the pusher toward the blades the pusher is drawn down through the chain to prevent it from contact with said blades while the chain holds the last unsliced remnant of the apple up at the level of the lower blade, the top of the pusher being at such time immediately behind said uncut remnant.

The gist of my improvement does not depend on the particular construction or dimensions of the chain belt nor in the particular mechanism for moving it. I have found, however, that a chain composed of links four inches square operates successfully, and also that the particular treadle shown, together with the wide feeding-box, having two supply-chutes, one on each side the chain, whereby both hands can be used to place apples on the chain, and whereby either foot can be used to run the machine, contributes to very rapid and successful work.

I am aware that a slicing-machine having straight pushing-fingers carried by a belt or chain so as to move the apples along a grate or slotted table has been heretofore known. In my construction the fruit rests upon and is carried directly by the belt, the pusher not being necessarily brought into operation until the slicing operation is begun.

Having now described my invention, what I desire to secure by Letters Patent is—

1. In combination, the endless chain, the pushers extending through the chain, and the track for the pushers, said track being curved to draw the pushers inwardly with respect to the chain, substantially as set forth.

2. In a fruit-slicing machine, an endless fruit-carrier composed of loosely-pivoted links provided with rack-teeth, a driving-gear adapted to engage the said rack, and a fruit-pusher loosely connected to the pivot of two adjacent links and having one end movable between the ends of links, the pivoted end of said pusher being slotted to permit the gear to engage the rack, substantially as set forth.

3. In a fruit-slicing machine, fruit-carrying mechanism, a pushing device adapted to be operated by said mechanism and adapted to extend above the position of the horizontal center of an apple and curved forwardly to bear on the fruit above said center, and fruit-cutting blades, substantially as set forth.

4. In combination with the endless chains, the curved tracks therefor and the blades having their edges arranged in a curved plane, the curved plane of said edges approaching that of the adjacent tracks, whereby the chain moves the unsliced remnants of the fruit against the lower blades, substantially as set forth.

5. In combination, the fruit-moving devices or carrier adapted to carry two or more apples side by side, the blades, the feeding box or table situated in part on each side of the carrier, and a hopper having a floor immediately over the carrier and two delivery-chutes, one on each side of the fruit-carrier and arranged to deliver fruit on each portion of the table, substantially as set forth.

6. In combination, the fruit-carrying device, the wheel for propelling the same, the crank-arm, two treadles, and the connecting-rod between the double treadle and arm, whereby either or both feet can be used to move the chain, a two-part table, and a hopper adapted to supply fruit on both the right and left of the machine, substantially as set forth.

7. In combination, the fruit-carrying chain adapted to carry two or more apples side by side, the chain-moving wheel, the crank-arm, two treadles, one under each part of the feeding box or table, and the connecting-rod between the treadle and the arm, whereby either or both feet can be used to move the chain, the hopper having a floor immediately over the carrier, and a delivery-chute on each side of the chain, substantially as set forth.

In testimony whereof I have signed this specification in the presence of two subscribing witnesses.

ARTHUR J. BARBER.

Witnesses:
 WALTER TRIPP,
 HENRY A. TRIPP.